United States Patent
Valdez et al.

(10) Patent No.: US 9,369,726 B2
(45) Date of Patent: *Jun. 14, 2016

(54) FRAME BLOCK COMPARISON

(71) Applicant: DISH NETWORK L.L.C., Englewood, CO (US)

(72) Inventors: Jason Valdez, Westminster, CO (US); Wayne Kunze, Denver, CO (US)

(73) Assignee: DISH NETWORK L.L.C., Englewood, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/796,733

(22) Filed: Jul. 10, 2015

(65) Prior Publication Data

US 2016/0007035 A1 Jan. 7, 2016

Related U.S. Application Data

(63) Continuation of application No. 14/469,730, filed on Aug. 27, 2014, now Pat. No. 9,113,152, which is a continuation of application No. 14/036,822, filed on Sep. 25, 2013, now Pat. No. 8,848,062, which is a continuation of application No. 13/645,053, filed on Oct. 4, 2012, now Pat. No. 8,570,379.

(51) Int. Cl.
*H04N 17/00* (2006.01)
*H04N 17/02* (2006.01)
(Continued)

(52) U.S. Cl.
CPC .............. *H04N 19/44* (2014.11); *G06K 9/6201* (2013.01); *G06T 7/0002* (2013.01);
(Continued)

(58) Field of Classification Search
CPC .................. G06T 7/0002; G06T 2207/10016; G06T 2207/10024; G06T 2207/20021; G06T 2207/30168; H04N 17/004; H04N 17/02; H04N 19/89; H04N 17/00; H04N 17/04; H04N 17/045
USPC .................. 348/180, 181, 189; 382/171, 173; 702/108, 117, 118
IPC ........................................... H04N 17/00, 17/02
See application file for complete search history.

(56) References Cited

U.S. PATENT DOCUMENTS 5,214,508 A 5/1993 Stevens
5,771,075 A 6/1998 Rim et al.
(Continued)

FOREIGN PATENT DOCUMENTS

EP 2490446 A1 8/2012
WO 99/65241 A1 12/1999
(Continued)

OTHER PUBLICATIONS

Extended European Search Report for EP 11 15 4580 dated Aug. 22, 2011, 8 pages.
(Continued)

*Primary Examiner* — Sherrie Hsia
(74) *Attorney, Agent, or Firm* — Kilpatrick Townsend & Stockton LLP

(57) ABSTRACT

Various arrangements for testing video decoder device functionality are presented. A video frame decoded by a video decoder device under test may be received. The received video frame may be segmented into a plurality of blocks. A first value may be calculated for a first block of the plurality of blocks of the received video frame using pixel values of pixels present within the first block. The first value may be compared to a first reference value. The first reference value may correspond to a first reference block of one or more reference frames. Video decoder functionality of the video decoder device may be determined to be functional at least partially based on comparing the first value to the first reference value.

20 Claims, 8 Drawing Sheets

(51) Int. Cl.
*H04N 19/44* (2014.01)
*G06T 7/00* (2006.01)
*H04N 19/89* (2014.01)
*H04N 19/176* (2014.01)
*G06K 9/62* (2006.01)

(52) U.S. Cl.
CPC ............ *H04N 17/004* (2013.01); *H04N 17/02* (2013.01); *H04N 19/176* (2014.11); *H04N 19/89* (2014.11); *G06T 2207/10016* (2013.01); *G06T 2207/10024* (2013.01); *G06T 2207/20021* (2013.01); *G06T 2207/30168* (2013.01)

(56) References Cited

U.S. PATENT DOCUMENTS

| | | | |
|---|---|---|---|
| 5,892,843 | A | 4/1999 | Zhou et al. |
| 6,012,109 | A | 1/2000 | Schultz |
| 6,281,929 | B1 | 8/2001 | Fimoff |
| 6,944,228 | B1 | 9/2005 | Dakss et al. |
| 7,957,561 | B2 | 6/2011 | Joung et al. |
| 8,570,379 | B1 | 10/2013 | Valdez et al. |
| 8,848,062 | B2 | 9/2014 | Valdez et al. |
| 9,113,152 | B2 | 8/2015 | Valdez et al. |
| 9,154,832 | B2 | 10/2015 | Valdez et al. |
| 2001/0017892 | A1 | 8/2001 | Barton et al. |
| 2002/0021805 | A1 | 2/2002 | Schumann et al. |
| 2003/0177503 | A1 | 9/2003 | Sull et al. |
| 2008/0001950 | A1 | 1/2008 | Lin et al. |
| 2008/0137968 | A1 | 6/2008 | Joung et al. |
| 2008/0172747 | A1 | 7/2008 | Hurtado et al. |
| 2008/0310722 | A1 | 12/2008 | Daniels et al. |
| 2009/0128633 | A1 | 5/2009 | Chapman |
| 2009/0248702 | A1 | 10/2009 | Schwartz et al. |
| 2009/0290711 | A1 | 11/2009 | Bloom et al. |
| 2010/0208891 | A1 | 8/2010 | Folea et al. |
| 2010/0232550 | A1 | 9/2010 | Lee et al. |
| 2010/0239226 | A1 | 9/2010 | Mountain |
| 2011/0126018 | A1 | 5/2011 | Narsinh et al. |
| 2011/0311098 | A1 | 12/2011 | Kim et al. |
| 2012/0207342 | A1 | 8/2012 | Quail |
| 2012/0328149 | A1 | 12/2012 | Chen et al. |
| 2013/0259139 | A1 | 10/2013 | Valdez et al. |
| 2013/0301872 | A1 | 11/2013 | Flaherty et al. |
| 2014/0098889 | A1 | 4/2014 | Valdez et al. |
| 2014/0362931 | A1 | 12/2014 | Valdez et al. |

FOREIGN PATENT DOCUMENTS

| | | |
|---|---|---|
| WO | 00/51348 A2 | 8/2000 |
| WO | 2004/029954 A1 | 4/2004 |
| WO | 2010/041208 A1 | 4/2010 |
| WO | 2013/148551 A1 | 10/2013 |
| WO | 2014/055321 A1 | 4/2014 |

OTHER PUBLICATIONS

International Search Report and Written Opinion of PCT/US2013/033659 mailed Jun. 10, 2013, 16 pages.
International Preliminary Report on Patentability for PCT/US2013/033659 mailed Oct. 9, 2014, 9 pages.
International Preliminary Report on Patentability for PCT/US2013/061853 mailed Apr. 16, 2015, 6 pages.
International Search Report and Written Opinion of PCT/US2013/061853 mailed Dec. 12, 2013, 11 pages.
U.S. Appl. No. 13/371,912 Final Office Action mailed Dec. 24, 2014, 18 pages.
U.S. Appl. No. 13/371,912 Non Final Office Action mailed Jul. 24, 2014, 19 pages.
U.S. Appl. No. 13/371,912 Non Final Office Action mailed Feb. 27, 2014, 23 pages.
U.S. Appl. No. 13/371,912 Non Final Office Action mailed Mar. 26, 2015, 17 pages.
U.S. Appl. No. 13/371,912 Notice of Allowance mailed Jul. 16, 2015, 16 pages.
U.S. Appl. No. 13/538,497 Non Final Office Action mailed Feb. 23, 2015, 42 pages.
U.S. Appl. No. 13/645,053 Notice of Allowance mailed Jul. 9, 2013, 15 pages.
U.S. Appl. No. 14/036,822 Notice of Allowance mailed May 27, 2014, 16 pages.
U.S. Appl. No. 14/036,822 Non Final Rejection mailed Jan. 6, 2014, 11 pages.
U.S. Appl. No. 14/469,730 Non Final Office Action mailed Oct. 20, 2014, 10 pages.
U.S. Appl. No. 14/469,730 Notice of Allowance mailed Apr. 14, 2015, 16 pages.
Author Unknown, "Picture Quality Analysis: Real-Time Measurements for Objective Video Quality," National Instruments, published Jun. 22, 2012, 4 pages. Accessed on May 21, 2015. Retrieved from http://www.ni.com/white-paper/12703/en/.
Langelaar, G., et al., "Watermarking Digital Image and Video Data—A State-of-the-Art Overview," IEEE Signal Processing Magazine, Sep. 2000, vol. 17, Issue 5, pp. 20-46.

(red block value, green block value, blue block value)

FRAME BLOCK COMPARISON

CROSS REFERENCES

This application is a continuation of U.S. patent application Ser. No. 14/469,730, filed Aug. 27, 2014, which is a continuation of U.S. patent application Ser. No. 14/036,822 filed Sep. 25, 2013, now U.S. Pat. No. 8,848,062, which is a continuation of Ser. No. 13/645,053 filed Oct. 4, 2012, now U.S. Pat. No. 8,570,379, the entire disclosures of which are incorporated by reference for all purposes.

This application is related to U.S. patent application Ser. No. 13/538,497, entitled "TESTING FRAME COLOR COUNTING TECHNIQUE," filed Jun. 29, 2012, which is hereby incorporated by reference for all purposes.

BACKGROUND

Testing a video decoder device, such as a set top box, can be a tedious and time-intensive activity for a person. Typically, in order to test that a video decoder device is functioning properly, the video decoder device is used to decode video of some length (e.g., multiple frames). FIG. 1 illustrates an embodiment of a system 100 configured to display a video signal decoded by a video decoder device. Signal source 110 provides a video signal that includes a series of video frames to set top box (STB) 120. In the illustrated embodiment, STB 120 has video decoding functionality. STB 120 outputs a decoded video signal to display device 130, which may be a television, monitor, or other device suitable for human viewing.

A person may watch the decoded video via display device 130 to see if STB 120 decoded the encoded video signal correctly. For instance, incorrectly decoded video may have various regions on a displayed frame that result in errors that are visibly noticeable to a person. If the person sees such problems, the person may determine the video frames have not been decoded properly and that the video decoding functionality of STB 120 is at least not completely functional.

Such a procedure for determining whether a video decoder device is functioning properly may have various disadvantages. For example, such a procedure may require a person to be monitoring a display of the decoded video. Further, a person who monitors decoded video frames for multiple video decoder devices (such as in a manufacturing arrangement) may be prone, over time, to misdiagnose a video decoder device as functioning properly or improperly.

SUMMARY

Various embodiments for testing video decoder device functionality are presented. In some embodiments, a method for testing video decoder device functionality is presented. The method may include receiving, by a computerized test device, a video frame decoded by a video decoder device under test. The method may include segmenting, by the computerized test device, the received video frame into a plurality of blocks. The method may include calculating, by the computerized test device, a first value for a first block of the plurality of blocks of the received video frame using pixel values of pixels present within the first block. The method may include comparing, by the computerized test device, the first value to a first reference value. The first reference value may correspond to a first reference block of one or more reference frames. The method may include determining, by the computerized test device, video decoder functionality of the video decoder device is functional at least partially based on comparing the first value to the first reference value.

Embodiments of such a method may include one or more of the following: The method may include selecting, by the computerized test device, a reference frame using a frame number of the first reference value. The frame number may be a color-encoded frame within the received video frame. Calculating the first value for the first block of the plurality of blocks of the received video frame using the pixel values of pixels may include using a first portion of each pixel value that corresponds to a first color. The method may include calculating, by the computerized test device, a second value for the first block of the plurality of blocks of the received video frame using a second portion of each pixel value of the pixel values, wherein the second portion of each pixel value corresponds to a second color. The method may include calculating, by the computerized test device, a third value for the first block of the plurality of blocks of the received video frame using a third portion of each pixel value of the pixel values, wherein the third portion of each pixel value corresponds to a third color. The first value may be a first summation of the first portion of each pixel value of the pixels. The second value may be a second summation of the second portion of each pixel value of the pixels. The third value may be a third summation of the third portion of each pixel value of the pixels. The method may include calculating, by the computerized test device, a second value for a second block of the plurality of blocks of the received video frame using pixel values of pixels present within the second block. The method may include comparing, by the computerized test device, the second value for the second block to a second reference value. The second reference value may correspond to a second reference block of one or more reference frames.

Embodiments of such a method may also include one or more of the following: The method may include determining, by the computerized test device, video decoder functionality of the video decoder device is functional at least partially based on comparing the second value to the second reference value. The method may be performed in real time. Comparing the first value to the first reference value may include determining if the first value is within a threshold range of the first reference value. The method may include, prior to receiving the video frame decoded by the video decoder device under test, calculating the first reference value. Calculating of the first reference value may include decoding the video frame by a first known-functional video decoder device. Calculating of the first reference value may include decoding the video frame by a second known-functional video decoder device. Calculating of the first reference value may include segmenting the video frame decoded by the first known-functional video decoder device decoded into a first reference plurality of blocks. Calculating of the first reference value may include segmenting the video frame decoded by the second known-functional video decoder device decoded into a second reference plurality of blocks. Calculating of the first reference value may include calculating a first decoder-specific value for a first reference block of the first reference plurality of blocks. Calculating of the first reference value may include calculating a second decoder-specific value for a second reference block of the second reference plurality of blocks. The first reference block of the first reference plurality of blocks and the second reference block of the second reference plurality of blocks may correspond in location within the video frame to each other. Calculating of the first reference value may also include using the first decoder-specific value and the second decoder-specific value, determining the first reference value.

In some embodiments, a system for testing video decoder device functionality is presented. The system may include a computer system comprising a processor and a memory. The memory may be communicatively coupled with and readable by the processor and having stored therein processor-readable instructions. When executed by the processor, the processor-readable instructions may cause the computer system to receive a video frame decoded by a video decoder device under test. When executed by the processor, the processor-readable instructions may cause the computer system to segment the received video frame into a plurality of blocks. When executed by the processor, the processor-readable instructions may cause the computer system to calculate a first value for a first block of the plurality of blocks of the received video frame using pixel values of pixels present within the first block. When executed by the processor, the processor-readable instructions may cause the computer system to compare the first value to a first reference value. The first reference value may correspond to a first reference block of a reference frame. When executed by the processor, the processor-readable instructions may cause the computer system to determine video decoder functionality of the video decoder device is functional at least partially based on comparing the first value to the first reference value.

Embodiments of such a system may include one or more of the following: When executed by the processor, the processor-readable instructions may cause the computer system to select, by the computerized test device, a reference frame using the frame number of the first reference value. The frame number may be a color-encoded frame within the received video frame. The processor-readable instructions that cause the computer system to calculate the first value for the first block of the plurality of blocks of the received video frame using the pixel values of pixels may include processor-readable instructions that cause the computer system to use a first portion of each pixel value that corresponds to a first color. When executed by the processor, the processor-readable instructions may cause the computer system to calculate a second value for the first block of the plurality of blocks of the received video frame using a second portion of each pixel value of the pixel values, wherein the second portion of each pixel value corresponds to a second color. When executed by the processor, the processor-readable instructions may cause the computer system to calculate a third value for the first block of the plurality of blocks of the received video frame using a third portion of each pixel value of the pixel values, wherein the third portion of each pixel value corresponds to a third color. The first value may be a first summation of the first portion of each pixel value of the pixels. The second value may be a second summation of the second portion of each pixel value of the pixels. The third value may be a third summation of the third portion of each pixel value of the pixels. When executed by the processor, the processor-readable instructions may cause the computer system to calculate a second value for a second block of the plurality of blocks of the received video frame using pixel values of pixels present within the second block.

Embodiments of such a system may include one or more of the following: When executed by the processor, the processor-readable instructions may cause the computer system to compare the second value for the second block to a second reference value. The second reference value may correspond to a second reference block of one or more reference frames. When executed by the processor, the processor-readable instructions may cause the computer system to determine video decoder functionality of the video decoder device is functional at least partially based on comparing the second value to the second reference value. The processor-readable instructions, which executed by the processor, cause the computer system to compare the first value to the first reference value may include processor-readable instructions which when executed cause the computer system to determine if the first value is within a threshold range of the first reference value. When executed by the processor, the processor-readable instructions may cause the computer system to calculate the first reference value. Calculating the first reference value may include processor-readable instructions that cause the computer system to decode the video frame by a first known-functional video decoder device. Calculating the first reference value may include processor-readable instructions that cause the computer system to decode the video frame by a second known-functional video decoder device. Calculating the first reference value may include processor-readable instructions that cause the computer system to segment the video frame decoded by the first known-functional video decoder device decoded into a first reference plurality of blocks. Calculating the first reference value may include processor-readable instructions that cause the computer system to segment the video frame decoded by the second known-functional video decoder device decoded into a second reference plurality of blocks. Calculating the first reference value may include processor-readable instructions that cause the computer system to calculate a first decoder-specific value for a first reference block of the first reference plurality of blocks. Calculating the first reference value may include processor-readable instructions that cause the computer system to calculate a second decoder-specific value for a second reference block of the second reference plurality of blocks. The first reference block of the first reference plurality of blocks and the second reference block of the second reference plurality of blocks may correspond in location within the video frame to each other. Calculating the first reference value may include processor-readable instructions that cause the computer system to use the first decoder-specific value and the second decoder-specific value, determining the first reference value.

In some embodiments, a computer program product residing on a non-transitory processor-readable medium for testing video decoder device functionality is presented. The computer program product may comprise processor-readable instructions configured to cause a processor to receive a video frame decoded by a video decoder device under test. The computer program product may comprise processor-readable instructions configured to cause the processor to segment the received video frame into a plurality of blocks. The computer program product may comprise processor-readable instructions configured to cause the processor to calculate a first value for a first block of the plurality of blocks of the received video frame using pixel values of pixels present within the first block. The computer program product may comprise processor-readable instructions configured to cause the processor to compare the first value to a first reference value. The first reference value may correspond to a first reference block of a reference frame. The computer program product may comprise processor-readable instructions configured to cause the processor to determine video decoder functionality of the video decoder device is functional at least partially based on comparing the first value to the first reference value.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
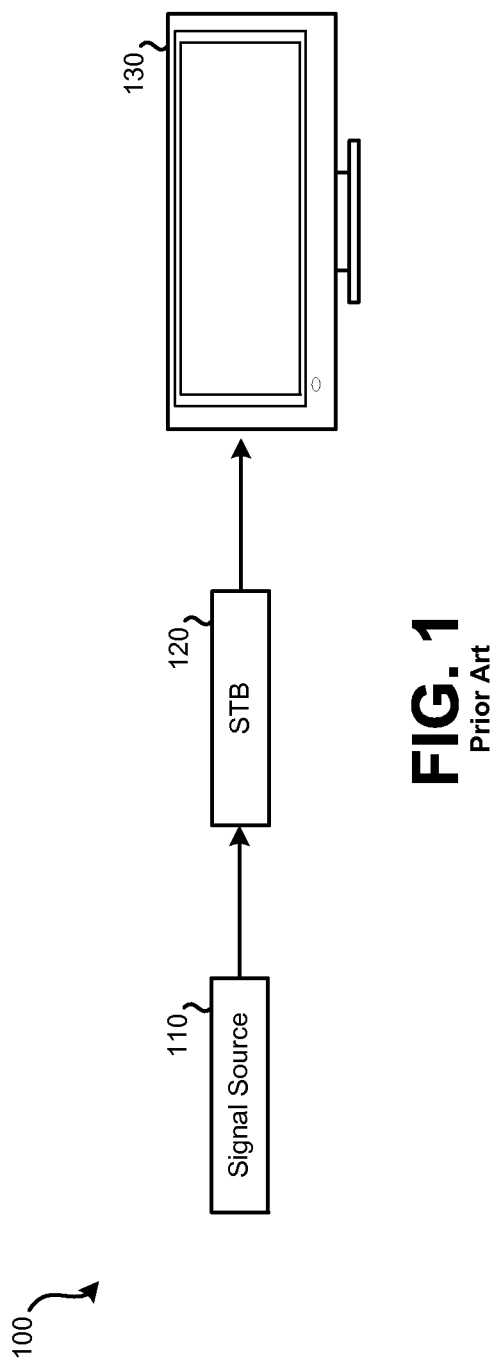
FIG. 1 illustrates an embodiment of a system configured to display a video signal decoded by a video decoder device.

Rather than having a person monitor a display device to determine if a video decoder is functioning properly, it may be desirable to have a test system and procedure that requires little to no evaluation by a person. Instead of having a person monitoring the decoded video output by a video decoder device, the decoded video may be compared to reference decoded video by a test system to determine if the video decoder device is functional or not. Further, it may be desirable for such a test system to be able to handle testing a video decoder device in real time or near real time. For example, in a manufacturing environment, video decoder devices may be tested in succession. As such, the speed at which each video decoder device is tested may affect the throughput of the manufacturing process. Such a test system may be able to detect macro-blocking, pixilation, incorrect brightness, incorrect contrast, incorrect color tones, and/or other possible video decoding errors.

In order to test a video decoder device, it may be connected with a source of encoded video and a test system configured to receive decoded video. The source of encoded video may transmit a series of encoded video frames to the video decoder device being tested. The video decoder device may then decode the encoded video frames from a first format, such as MPEG, to a second format, such as RGB component video or an HDMI-appropriate video format, which may be appropriate to output to a display device, such as a television. However, rather than outputting the decoded signal to a display device, the decoded signal may be output to a test system.

The test system may identify a frame number of a frame decoded by the video decoder device under test. Each encoded video frame provided to the video decoder device may indicate a frame number. This frame number may be in the form of a color code appearing on the video frame. In other embodiments, characters (e.g., numerals) may be present as part of the video frame that identifies the frame number. Using the frame number present in the decoded video frame, the test system may select reference data related to one or more corresponding reference frames for comparison. When the video decoder is functioning properly, the one or more reference frames will appear either identical or very similar to the video frame decoded by the video decoder device under test. Similarly, reference data calculated from the one or more reference frames should be nearly identical to data calculated using the video frame decoded by the video decoder device under test when functioning properly.

The decoded video frame received by the test system from the video decoder device under test may be segmented into multiple blocks. Some or all of these blocks may be tested individually. For each block, one or more values may be computed. For example, in some embodiments, three values are computed for each block: a red value, a green value, and a blue value. Each of these values may be a summation. The red value may be the summation of the red intensity of each pixel within the block; the green value may be the summation of the green intensity of each pixel within the block; and the blue value may be the summation of the blue intensity of each pixel within the block. Values may be computed (or may have previously been computed) for the corresponding block of the one or more reference frames. The corresponding block of the one or more reference frames refers to a block having the same location (e.g., coordinates) within the one or more reference frames as the block has within the video frame decoded by the video decoder device under test. The values may be compared (e.g., the red value to the red value of the corresponding block of the reference frame). If each value is within a threshold range of similarity of the corresponding value of the reference frame, the block may be considered to be the same as the corresponding block of the reference frame.

This process may be repeated for some or all of the blocks of the decoded video frame. This process may be further repeated for multiple video frames. If values computed for all of the blocks of the decoded video frames match the corresponding values calculated for corresponding blocks of the reference frames, it may be determined that the decoded video frames sufficiently match the reference frames and that the video decoder device is functional. If some number of values calculated for the decoded video frames do not match the reference values calculated for the corresponding blocks of the corresponding reference frames, the video decoder device may fail the test and/or a secondary test procedure may be performed to determine if the failure is substantial enough to affect viewing by a human viewer. For instance, while a video decoder device may fail the test, video may still be decoded sufficiently well that the viewing experience of a human viewing a display device (e.g., television) that is displaying the decoded signals produced by the video decoder device is not affected or is only slightly affected by the one or more problems that caused the failure. In such a case, the video decoder device may be considered functional.

Figure 2:
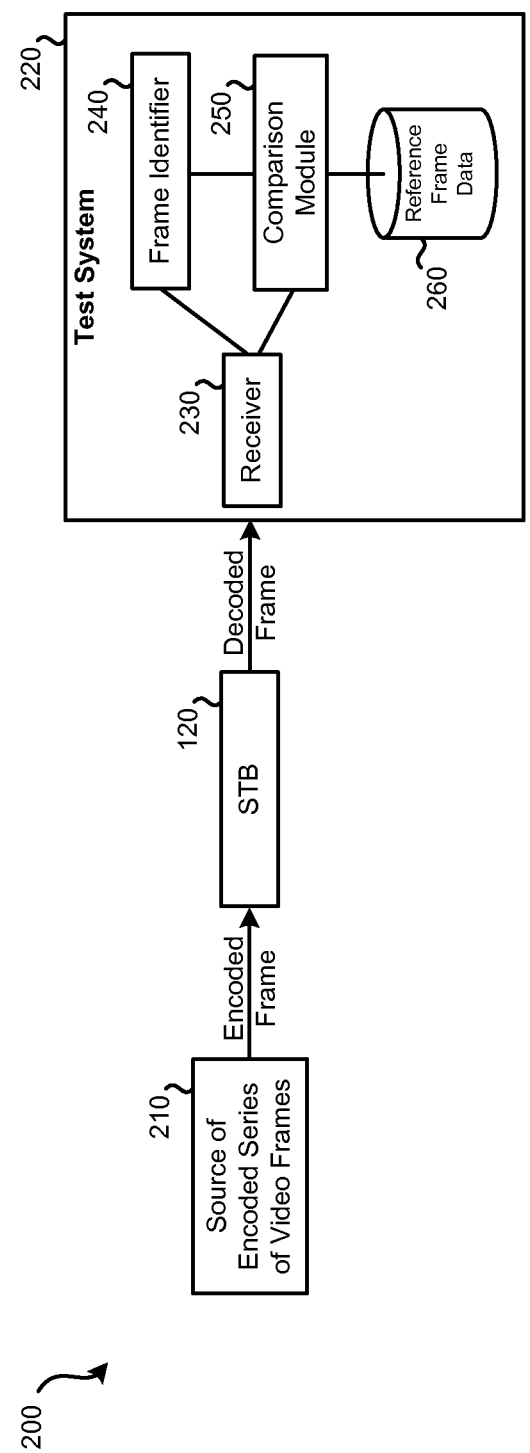
FIG. 2 illustrates an embodiment of a system configured to test the functionality of a video decoder device.

FIG. 2 illustrates an embodiment of a system 200 configured to test the functionality of a video decoder device. System 200 may include: source of encoded series of video frames 210, set top box (STB) 120, and test system 220. Test system 220 may include receiver 230, frame identifier 240, comparison module 250, and reference frame database 260. It should be understood that other embodiments of system 200 may have greater or fewer components.

Source of encoded series of video frames 210 may represent a video source that transmits a series of video frames encoded in a format such as MPEG. This encoded format may represent the format in which set top box 120 receives signals during standard operation, such as during use in a satellite television network or cable television network. Some or all video frames received from source of encoded series of video frames 210 may contain a color pattern that remains present following decoding and is used by test system 220 to determine the frame number. The encoded series of frames transmitted by source of encoded series of video frames 210 may be transmitted as a loop. After the end of the loop of encoded frames is transmitted, the beginning of the series of frames may be transmitted again, thus resulting in a continuous loop being output by source of encoded series of video frames 210.

Each encoded frame output by source of encoded series of video frames 210 may be received as an input by set top box 120. Set top box (STB) 120 represents an STB being tested for video decoding functionality. In system 200, STB 120 may receive encoded frames (such as in MPEG format) and may output decoded frames into another format. STB 120 may have one or more processes being executed by one or more processors that decode received encoded frames into decoded frames. The output decoded frames may have been decoded to a format suitable for display on the television or other display device. In a testing arrangement, such decoded frames may be output to and received by test system 220. A color pattern present in each encoded frame may remain present in each corresponding decoded frame. While system 200 is illustrated as testing STB 120, it should be understood that other video decoder devices may be tested using a similar system. For example, a video decoder device present in a television may be tested using a similar arrangement of inputting encoded frames and testing the output of decoded frames.

Test system 220 may receive each decoded frame output by STB 120. Some or all of these decoded frames may be analyzed to determine if STB 120 properly decoded the encoded frames. Receiver 230 of test system 220 may receive the decoded frames from STB 120. To determine if each of these frames was decoded properly, each frame may be compared to a corresponding reference frame. A color pattern present on each decoded frame (assuming STB 120 decoded each frame substantially well enough that the color pattern is present) may be used by frame identifier 240 of test system 220 to identify the frame number of the decoded frame. In some embodiments, rather than using a color pattern, numerals or other characters may be used. It should be understood that other ways of identifying a frame number of the video frame may exist. Using the frame number, a corresponding reference frame and/or data related to the corresponding reference frame may be retrieved from reference frame database 260 or some other form of data store that contains the reference frames and/or data related to reference frames. Such reference frames and/or data related to reference frames may be stored remotely or locally (as illustrated) in relation to test system 220. Comparison module 250 may perform a comparison based on the decoded frame and the corresponding reference frame that was selected based on the color pattern present within the decoded frame. If the frame decoded by STB 120 was decoded properly, the decoded frame received by receiver 230 should identically or nearly identically match the corresponding reference frame.

Therefore, referring to system 200, a first encoded frame is transmitted to STB 120. STB 120 may decode this frame into a decoded format appropriate for output to a television or other form of display device. In the testing arrangement of system 200, this decoded frame may be received by receiver 230 of test system 220. Frame identifier 240 may identify the frame number of the received decoded frame based on a color pattern present within the decoded frame. A reference frame that corresponds to the frame number identified by the color pattern may be accessed and compared to the decoded frame by comparison module 250. The comparison process is detailed in relation to FIGS. 3 and 6. If STB 120 properly decoded the frame, the decoded frame and the corresponding reference frame should appear identical or at least very similar (for instance, slight differences may occur due to the decoding process and noise).

Test system 220 may be at least partially implemented using a computer system. As such, various components of test system 220 may be performed by a computer system, such as computer system 800 of FIG. 8. Similarly, a computer system may serve as source of encoded series of video frames 210. In some embodiments, the same computer system may serve as test system 220 and source of encoded series of video frames 210.

While the above example discusses a single frame being decoded by STB 120, it should be understood that the testing procedure may involve multiple video frames. For example, a testing procedure may involve 30 frames per second being decoded by set top box 120 for multiple seconds (e.g., 120 frames over the course of 4 seconds). Using the color pattern present on each frame (or at least some frames), the frame number of the decoded frames may be determined in real time for comparison to corresponding reference frames. The comparison of the decoded frames to the reference frames may also be performed in real time. To clarify, real time is used to refer to operation within a strict time constraint such that identification of the frame numbers and comparison of the decoded frames to the reference frames occur substantially at the same time the decoded frame is received by test system 220. When performed in real time, for example, if 120 frames are provided to the STB over a period of four seconds, within the four seconds, a comparison of each block of each frame with reference data may be performed.

Figure 3:
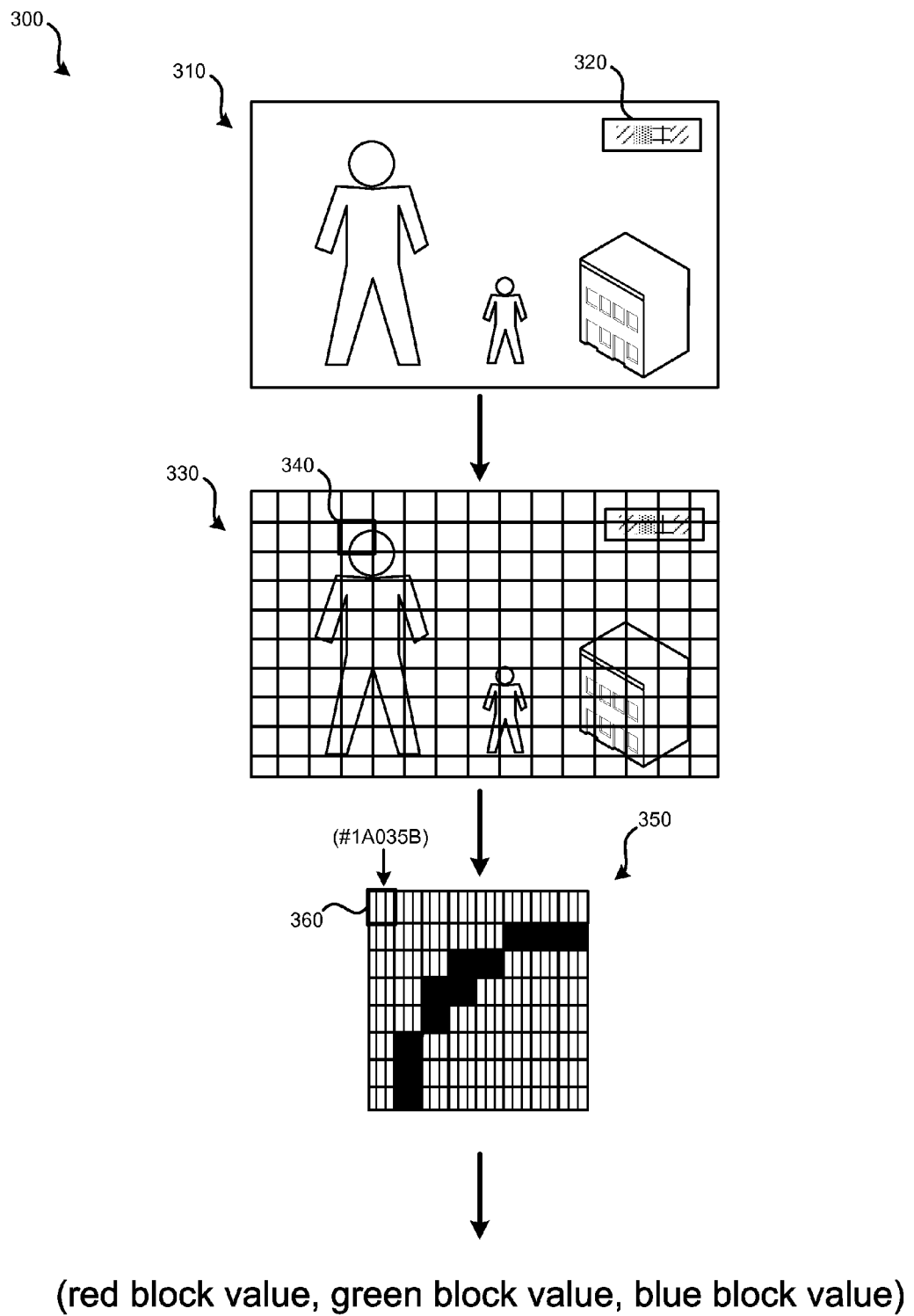
FIG. 3 illustrates an embodiment of a block of a video frame being analyzed.

FIG. 3 illustrates an embodiment 300 of blocks of a video frame being analyzed. The analysis described in relation to embodiment 300 may be performed by a test system, such as test system 220 of FIG. 2. More specifically, comparison module 250, which may include one or more processors, may perform the analysis described in relation to embodiment 300.

Decoded frame 310 represents a frame decoded by a video decoder device under test, such as STB 120 of FIG. 2. Decoded frame 310 may be received as part of a series of decoded frames from the video decoder device under test. Color pattern 320 may be used to determine the frame number of the decoded frame. Further detail regarding how a color pattern may be used to determine a frame number is detailed in previously referenced "Testing Frame Color Counting Technique," U.S. patent application Ser. No. 13/538,497, filed Jun. 29, 2012. Decoded frame 310 contains images of two persons, one large and one small, and a building. Such content of decoded frame 310 is for example purposes only.

Following decoded frame 310 being received, decoded frame 310 may be segmented into multiple blocks. Segmented frame 330 represents decoded frame 310 segmented into multiple blocks (as illustrated, 150 blocks). The number of blocks may vary by embodiment. For example, in some embodiments, each block is 16 pixels by 16 pixels. A block is used to refer to a section of a frame processed as a unit. The term block does not imply a shape. In embodiment 300, each block is square, however rectangular or some other shape of blocks may be used. Further, each block does not need to be the same size or shape of other blocks. Some or all of the blocks in segmented frame 330 may be analyzed. For instance, only certain blocks may be analyzed if insufficient computing power is available to analyze all blocks in a real-time environment. In embodiment 300, block 340 is analyzed. In segmented frame 330, the outline of block 340 is made bold for visibility in FIG. 3. It should be understood that additional blocks (e.g., all) of decoded frame 310 may be analyzed.

A magnified view of block 350 is show as part of FIG. 3. Individual pixels are visible in magnified view of block 350. As illustrated, block 340 is 16 pixels by 16 pixels. Each pixel contains three sub-pixels. Each sub-pixel is associated with a particular color. A pixel may have a red sub-pixel, a blue sub-pixel, and a green sub-pixel. Pixel 360, which has three sub-pixels, is made bold for visibility as part of FIG. 3. For each pixel in decoded frame 310 (and, thus segmented frame 330), a numerical value may be present in the decoded video signal. For each pixel, three values may be present: a red value, a blue value, and a green value. Such a value may be expressed as a single number called an RGB (Red Green Blue) triplet. For instance, RGB Triplet #00FF27 may refer to a red value of zero (the first two numbers), a green value of FF (the middle two numbers), and a blue value of 27 (the last two numbers). In FIG. 3, the RGB triplet for pixel 360 is #1A035B, thus meaning a red value of 1A, a green value of 03, and a blue value of 5B. An RGB triplet may be present for each pixel of block 350 (and each other pixel of decoded frame 310).

One or more values may be computed for block 350. In some embodiments, a separate value is computed for each color (red, green and blue) of block 350. Each value may be the sum of a color's RGB triplet value for each pixel of the block. As such, for a red summation value, the sum of the red value of the RGB triplet for each pixel of block 350 may be added. For instance, referring to pixel 360, the hexadecimal value 1A may be the red value that is included in the summation. A red summation value that is the sum of red values of pixels in the block, a green summation value that is the sum of green values of pixels in the block, and a blue summation value that is the sum of blue values of pixels in the block may be calculated. These values may be calculated for other blocks of decoded frame 310 and/or for additional frames. In some embodiments, rather than a summation of the values, some other value or values may be calculated for each block, such as one or more average values, median values, mode values, maximum values, minimum values, etc.

The values calculated for block 350 may be compared to values calculated for a corresponding block of a corresponding reference frame (the block in the same location of a corresponding reference frame). As such, if the values of block 350 and the values of the corresponding block of a corresponding reference frame match (or match within a threshold range), the block is determined to match the reference block. If each (or at least a threshold number) of the values calculated for blocks of decoded frame 310 match the corresponding reference values of blocks of the corresponding reference frame, it may be determined that decoded frame 310 matches the reference frame, and thus, decoded frame 310 was decoded properly and the video decoder device is functional.

Figure 4:
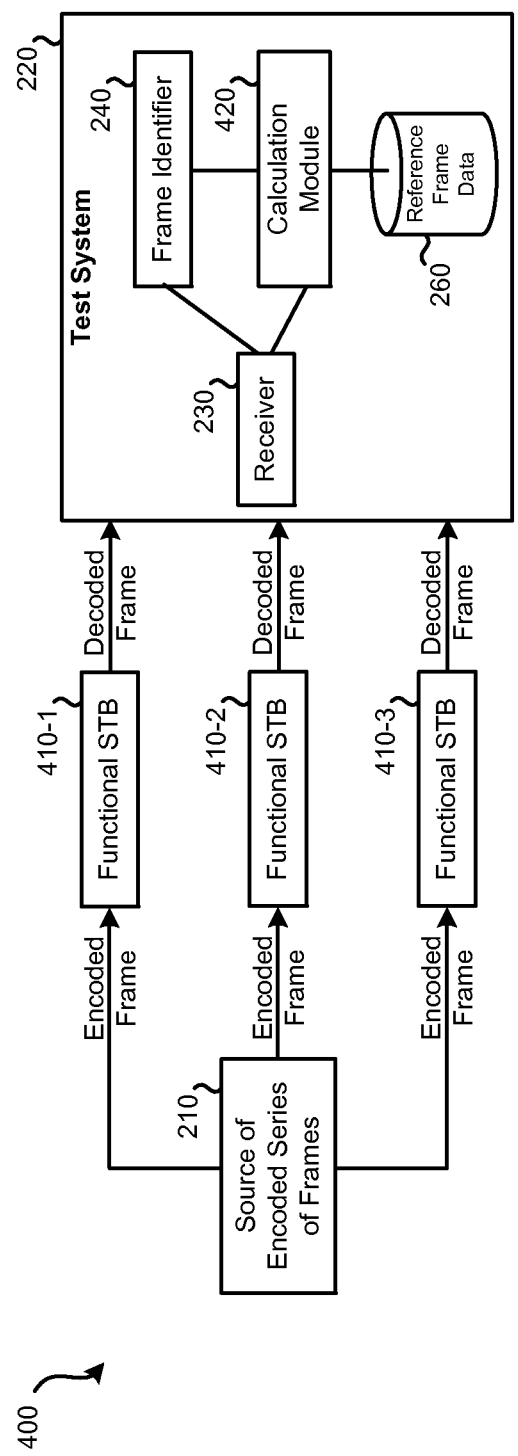
FIG. 4 illustrates an embodiment of a system configured to create reference data for use in testing a video decoder device.

In order to have a set of one or more reference frames for comparison to the frames decoded by the video decoder device under test, encoded frames may need to be decoded by one or more known functional video decoder devices to create the reference frames. FIG. 4 illustrates an embodiment of a system 400 configured to create reference data for use to test a video decoder device. System 400 may include: source of encoded series of video frames 210, functional STBs 410, and test system 220.

As detailed in relation to system 200 of FIG. 2, source of encoded series of video frames 210 may represent a video source that transmits a series of video frames encoded in a format such as MPEG. This encoded format may represent the format in which set top box 120 receives signals during standard operation, such as during use in a satellite television network or cable television network. The series of video frames provided to functional STBs 410 may be same as the series of video frames that are provided to a video decoder device under test for functionality. Some or all video frames received from source of encoded series of video frames 210 may contain a color pattern that remains present following decoding and is used by test system 220 to determine the frame number.

Each encoded frame output by source of encoded series of video frames 210 may be received as an input by functional set top boxes 410. FIG. 4 illustrates three set top boxes that are known to acceptably decode video, thus these set top boxes are referred to as known functional STBs 410. System 400 uses three functional STBs 410, however fewer or greater numbers of functional STBs may be used in other embodiments. Functional STBs 410 may be the same brand and, possibly, model of the STBs that will be tested for functionality. Decoding may vary slightly across brands and/or models of video decoder devices, therefore using the same brand (and model) may decrease the possibly of identifying a video decoder device under test as not functional due to such decoding variability.

Encoded video frames may be transmitted by source of encoded series of video frames 210 to each of functional STBs 410. The encoded video frames may be output to each function STB in parallel (e.g., at the same time) or, alternatively, each of functional STBs 410 may be connected individually to source of encoded series of video frames 210. Each of functional STBs 410 may decode the encoded video frames received from source of encoded series of video frames 210. While the known functional video decoder devices are STBs in system 400, it should be understood that in other embodiments known functional video decoder devices besides STBs may be used, such as video decoder devices built-in to a television.

In system 400, functional STBs 410 may receive encoded frames (such as in MPEG format) and may output decoded frames. This is the same format that video decoder devices under test will output. Functional STBs 410 may have one or more processes being executed by one or more processors that decode received encoded frames into a decoded format. The output decoded frames may be decoded to a format suitable for display on a television or other display device. Such decoded frames may be output to and received by test system 220. Since functional STBs 410 are known to be functional, decoded video frames from each STB of functional STBs 410 are treated as accurate. A color pattern present in each encoded frame may remain present in each corresponding decoded frame and may be used to identify a frame number of the decoded frame.

Frame identifier 240 may identify the frame number of the received decoded frame based on a color pattern present within the decoded frame. In some embodiments, numerals or characters are used instead of a color pattern. Other arrangements to identify frame numbers may also be possible. Calculation module 420 may create a set of reference frames and/or reference data based on the decoded frames received from functional STBs 410. Creation of the reference frames and/or reference data may be performed by calculation module 420 as detailed in relation to embodiment 500 of FIG. 5. Reference frame database 260 may represent a database (or other form of storage arrangement) where reference frames and/or reference data created by calculation module 420 are stored. If each functional STB of functional STBs 410 is connected individually (i.e., one at a time) to source of encoded series of video frames 210, creation of the reference data and/or reference frames may be performed by calculation module 420 once each functional STB of functional STBs 410 has been used to create decoded frames.

While test system 220 is the same test system as used to test video decoder devices in FIG. 2, it should be understood that separate test systems may be used to create reference frames and to use the reference frames to test video decoder devices.

Figure 5:
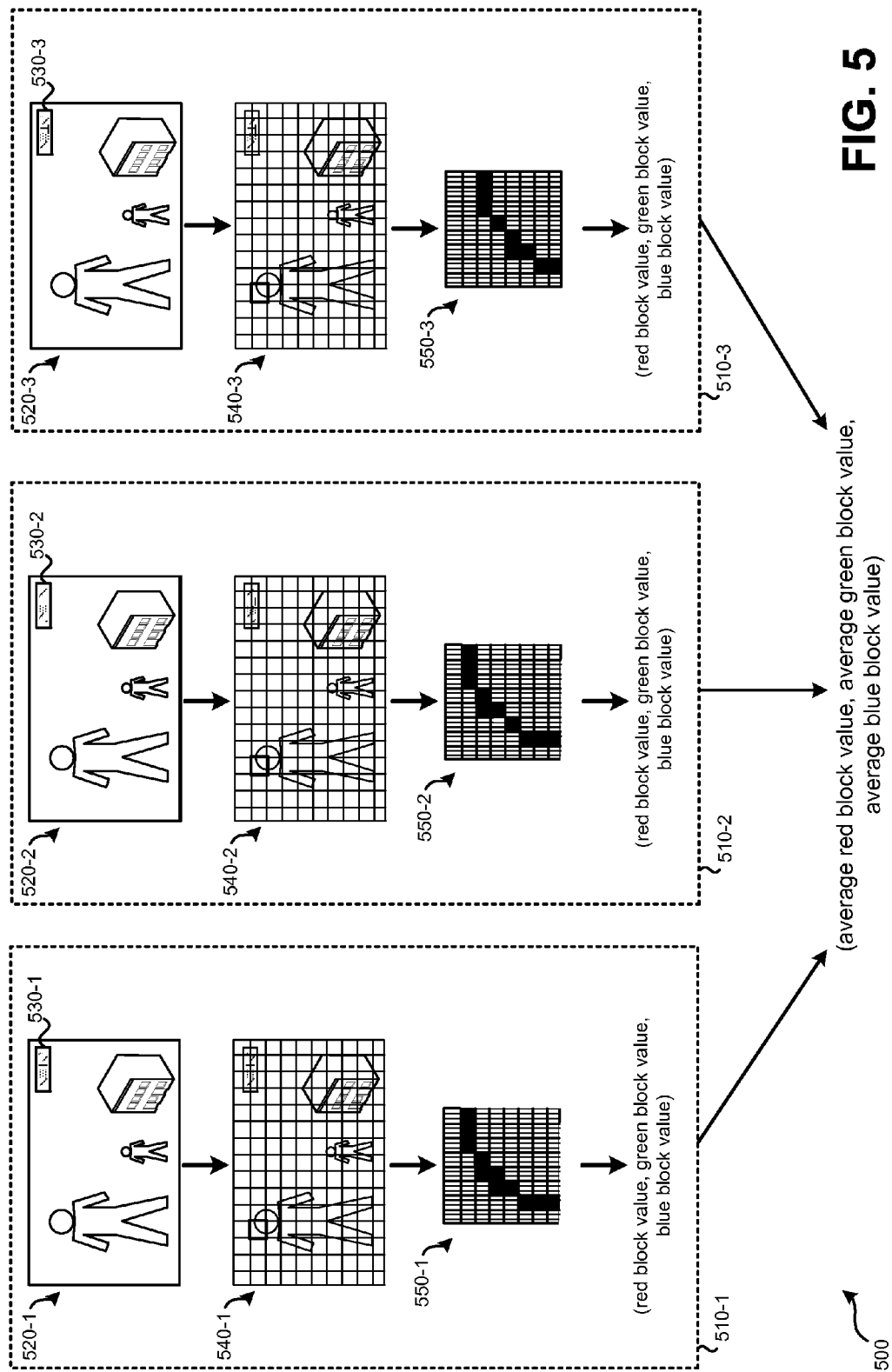
FIG. 5 illustrates an embodiment of creating reference data for use in testing the functionality of a video decoder device.

FIG. 5 illustrates an embodiment of creating reference data for use to test the functionality of a video decoder device. The analysis described in relation to embodiment 500 may be performed by a test system, such as test system 220 of FIG. 4. More specifically, calculation module 420, which may include one or more processors, may perform the analysis described in relation to embodiment 500.

Analyses 510 may be conducted on a block-by-block basis for each frame decoded by each functional STB. For example, analysis 510-1 may correspond to a decoded frame created by functional STB 410-1; analysis 510-2 may correspond to a decoded frame created by functional STB 410-2; and analysis 510-3 may correspond to a decoded frame created by functional STB 410-3. As such, a separate analysis may occur or decoded frames or by each functional STB used in system 400 (or some other system used to decode frames to create the reference frames and/or reference data). Each of decoded frames 520 contains a color pattern. Color patterns 530 may be used to determine the frame number of each decoded frame. Each color pattern of color patterns 530 are the same because the same frame decoded by each functional STB is displayed. In some embodiments, reference frames may be created by averaging together corresponding decoded frames 520 on a pixel-by-pixel basis. In some embodiments, a reference frame is based on a frame decoded by a simple functional video decoder device, such as decoded frame 520-1.

Following decoded frames 520 being received from a functional STB, decoded frames 520 may be segmented into multiple blocks. Segmented frames 540 represents decoded frames 520 being segmented into multiple blocks (as illustrated, 150 blocks). The number of blocks may vary by embodiment. In some embodiments, each block is 16 pixels by 16 pixels. The blocks may be in the same location within the frame as the locations of blocks in frames decoded by STBs under test. In embodiment 500, each block is square, however rectangular or some other shape of blocks may be used. Further, each block does not need to be the same size or shape of other blocks. Some or all of the blocks in segmented frames 540 may be analyzed. For instance, only certain blocks that will be analyzed for a video decoder device under test may be analyzed. In embodiment 500, blocks 550 are analyzed for each segmented frame of segmented frames 540. As such, blocks 550 are located on the same location of the same numbered frames. In segmented frames 540, the outlines of blocks 550 are made bold for visibility in FIG. 5. It should be understood that additional blocks (e.g., all) of decoded frames 520 may be analyzed.

A magnified view of blocks 550 are shown as part of FIG. 5. Magnified view of block 550-1 corresponds to the highlighted block of segmented frame 540-1. Individual pixels are visible in magnified view of blocks 550. As illustrated, blocks 550 are each 16 pixels by 16 pixels. Each pixel contains three sub-pixels, as previously detailed. Each sub-pixel is associated with a particular color. For each pixel in decoded frames 520 (and, thus segmented frames 540), a numerical value may be present in the decoded video signal. For each pixel, three values may be present: a red value, a green value, and a blue value. Such a value may be expressed as an RGB triplet.

Despite the fact that each of the functional STBs used to perform analyses 510 is known to be working and, possibly, may be manufactured by the same manufacturer and may be the same model, slight variations in decoding may exist. As can be seen in the magnified views of blocks 550, variations exist in the block alignment and the RGB triplet values of various pixels (and, thus, sub-pixels). Despite these variations, each decoded frame may be considered acceptable because they appear identical or at least similar to a human viewing such decoded video signals via a display device.

One or more values may be computed for each of blocks 550. In some embodiments, a separate value is computed for each color (red, green and blue) of blocks 550. Each value may be sum of a color's RGB triplet value for each pixel in the block. As such, for a red summation value of block 550-1, the sum of the red values of the RGB triplet for each pixel of block 550-1 may be added. A red summation value that is the sum of red values, a green summation value that is the sum of green values, and a blue summation value that is the sum of blue values may be calculated. These summation values may be calculated for other blocks of decoded frames 520 and/or for additional frames. In some embodiments, rather than a summation of the values, some other value or values may be calculated for each block, such as one or more average values, median values, mode values, maximum values, minimum values, etc.

Following the above calculation, values may be present for blocks 550 for each of analyses 510. Each value that corresponds to a color may then be averaged to obtain an average value. For instance, the red summation value from block 550-1, the red summation value from block 550-2, and the red summation value from block 550-3 may be averaged to determine an average red summation value for blocks 550. This average summation value may be used as reference data for comparison with the same block of the same frame when decoded by a video decoder device under test. Averaging (or some other calculation for combining the analyses conducted using the separate functional STBs, such as a median or mode) may be used for each color and/or for each block of decoded frame 520, and/or for additional frames. For example, a set of reference data may be created for each block of an entire series of frames. The averaged data created in embodiment 500 may be stored and/or may be used to create a set of reference data using the averaged red, green, and blue values. This set of reference data may be used as the standard for comparison to decoded video frames outputted by a video decoder device under test.

Figure 6:
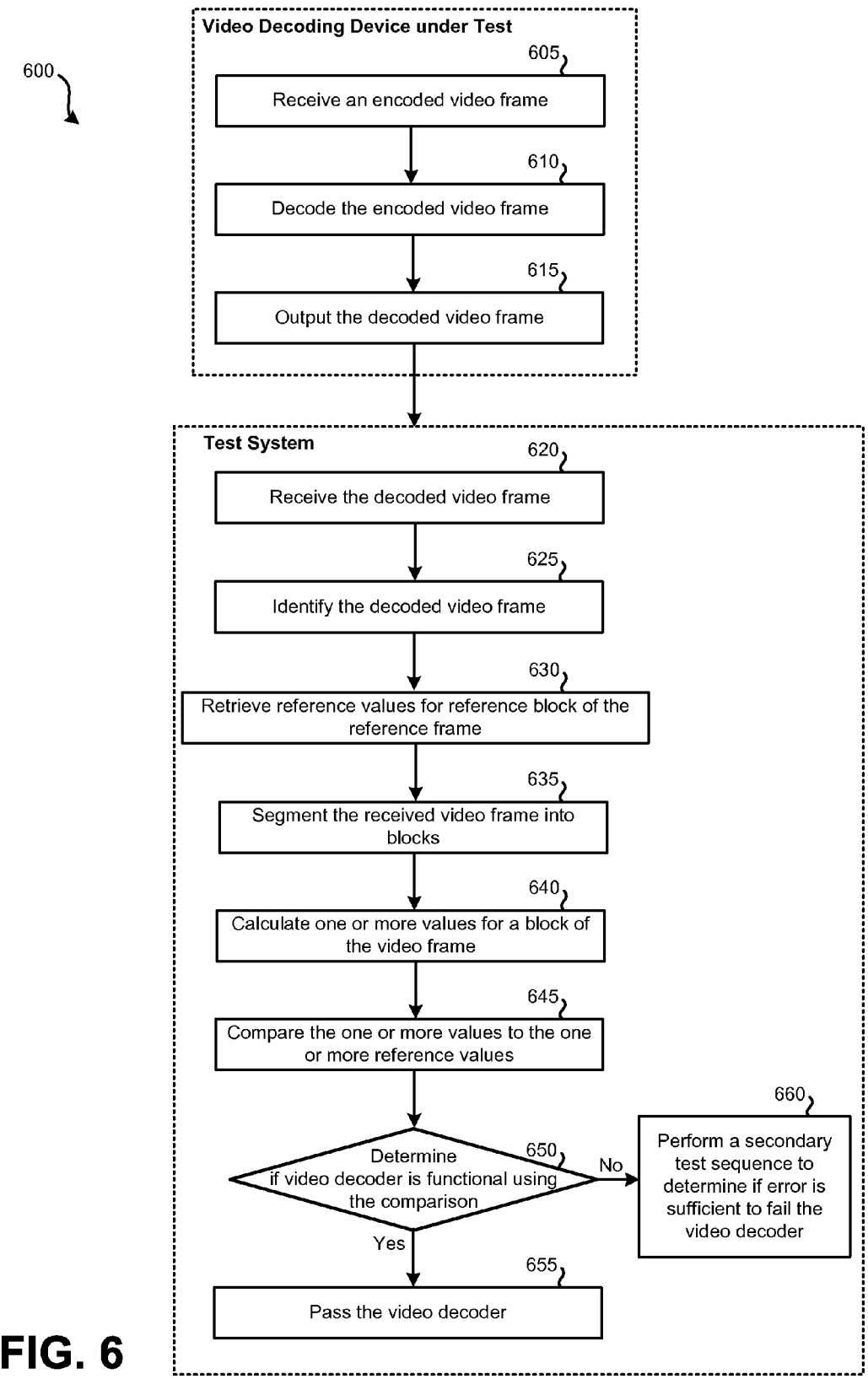
FIG. 6 illustrates an embodiment of a method for testing video decoder device functionality.

Various methods may be used to test video decoder functionality of a video decoder device using the systems and arrangements previously described. FIG. 6 illustrates an embodiment of a method 600 for testing video decoder device functionality. Method 600 may be performed using a set of reference frames and/or reference data that was previously created, such as using method 700 of FIG. 7. Method 600 may be performed using system 200 of FIG. 2. To perform method 600, a video decoder device under test, such as a set top box, may be connected (simultaneously) with a source of an encoded series of frames and a test system. Means for performing method 600 include a source of an encoded series of frames, a video decoder device to be tested, and a test system. The test system may be the same device as the source of the encoded series of frames. The test system and/or the source of the encoded series of frames may be or may include one or more computer systems.

At step 605, an encoded video frame may be received by the video decoder device under test. The encoded video frame may previously have been decoded by one or more known functional video decoder devices to create reference data and/or reference frames for comparison with the decoded output video frame of the video decoder device (such as in accordance with method 700). In FIG. 2, the video decoder device under test is a set top box. The received encoded video frame may be received as part of a series of encoded video frames. The received encoded video frame may be received from a source of encoded video frames, which may be connected with the video decoder device under test. The encoded video frame may include a color pattern or other indication that is used to identify a frame number of the encoded video frame. This color pattern or other visual indication may be preserved following the decode process (assuming the video decoder device under test is functioning sufficiently well enough to decode the portion of the encoded video frame where the color pattern or other indication is present). The received encoded video frame may be in MPEG format, which may represent the format that the video decoder device under test will decode from during normal operation (e.g., decoding a satellite or cable television signal that is output to a television). At step 610, the video decoder device under test may decode the encoded video frame to a second format, which may represent the format that the video decoder device under test will decode to during normal operation. At this point, it is unknown whether the decoding function performed by the video decoder device was fully or substantially performed correctly. At step 615, the video decoder device under test may output the decoded video frame to the test system, which may be coupled with an output of the video decoder device under test.

At step 620, the decoded video frame from the video decoder device under test may be received by the test system. The two devices may be physically connected, such as via a coaxial cable. At step 625, a frame number of the decoded video frame may be identified in order to retrieve reference data (which may include a reference frame and/or reference values for each block of a corresponding reference frame) that corresponds to the decoded video frame. The frame number indicated in the decoded video frame may be used to select the reference data. The frame number may be indicated using characters, a color pattern, or some other visual indication of the frame number. As an example, if the decoded frame number is 27, the reference data selected may be reference data for reference frame 27.

At step 630, reference data for the corresponding reference frame may be retrieved. Reference data may include reference values for some or all blocks of the reference frame retrieved. For instance, the reference values may be summations of red values, green values, and blue values for individual blocks of the reference frame. Values may be retrieved for blocks of the reference frame that are to be compared with blocks of the decoded video frame.

In other embodiments, the reference data retrieved at step 625 may be a reference frame, which may be used to calculate reference values for one or more blocks of the reference frame. The reference values may include color values for one or more blocks of the corresponding reference frame. For a particular block of the reference frame, these reference values may be present: the reference values may be summations of red values, green values, and blue values for pixels within the block of the reference frame. Each of these values may be a summation of that color's component of an RGB triplet for each pixel within the block. As such, a red value summation, a green value summation, and a blue value summation may be present for each block within the reference frame. In some embodiments, rather than summations, medians, means, or modes may be retrieved or calculated for each color within a block.

At step 635, the decoded video frame received at step 620 may be segmented into one or more blocks. These blocks may correspond to the same locations as the blocks of the corresponding reference frame. As such, a block of the decoded video frame is expected to appear similar or identical to a block in the same location of the corresponding reference frame if the video decoder device is decoding video properly. As a more concrete example, the block in the second column, third row, of a decoded video frame numbered 27 would be expected to appear similar or identical to the reference block in the second column, third row, of reference frame 27.

At step 640, one or more values for a block of the segmented decoded video frame of step 635 may be computed. Step 640 may be repeated for some or all blocks of the decoded video frame segmented at step 635. For the block of the segmented decoded video frame, a value may be computed for a specific color. A value may be a summation of the color-specific portion of the RGB triplet for each pixel within the block. As such, a red value may be the summation of the red value present in the RGB triplet for each pixel within the block. If three values are calculated for the block, a red value, a green value, and a blue value may be calculated. It should be understood that rather than summations, means, modes, or medians may be computed for each color in a block. Other calculations based on the color value of each pixel within a block are also possible.

At step 645, the values calculated for the block at step 640 may be compared to the reference values retrieved (or calculated) at step 630. The values for the blocks correspond to the same block location within the decoded video frame as the block used to create the reference values within the reference frame. The block of the decoded video frame should appear visually identical or substantially similar to the block of the reference frame if the video frame was decoded by the video decoder device properly. Accordingly, the reference values should be the same or substantially similar to the values calculated for the block at step 640. A red value summation for the block of the decoded video frame may be compared to a red value summation of the reference data that corresponds to the same block of the corresponding reference frame. A similar comparison may occur for the green value summation and blue value summation. The values may be required to match within a threshold range. For instance, the red value summation of the block of the decoded video frame may not identically match the red value summation of the corresponding block of the corresponding reference frame, but may need to be within a threshold range to be considered a match. The tolerance, as defined by the threshold range, may be user-defined. The larger the range, the fewer the number of potential errors by the video decoder device may be detected; the smaller the range, errors not visible to an average human viewer may be likely to be detected.

The comparison of step 645 may occur for some or all blocks of the decoded video frame. Further, the comparison of step 645 may occur for multiple video frames. For example, every block of each frame of a series of 240 frames decoded by the video decoder device may be compared to reference values calculated for corresponding blocks of a series of 240 reference frames. At step 650, using one or more (e.g., all) of the value comparisons of step 650, it may be determined if the video decoder is functional. In order to be determined functional, all (or some number above a threshold value) of value comparisons between the decoded video frame(s) and the reference video frame(s) may need to match (within a threshold range).

At step 655, if it is determined that all (or some number above a threshold value) of value comparisons between the decoded video frame(s) and the reference video frame(s) match (within a threshold range), the video decoder device may be determined to have successfully decoded one or more encoded video frames and may be considered to pass the functionality test. This may conclude the testing of the video decoder capabilities of the video decoder device. If it is determined that an insufficient number of value comparisons between the decoded video frame(s) and the reference video frame(s) match (within a threshold range), additional testing may be performed at step 660. A secondary test at step 660 may be performed to determine if the errors that caused the video decoder device to fail step 650 are likely to be visible to a human viewer under normal operation. If the errors are not substantially visible, the video decoder device may be considered functional.

Method 600 may be performed in real time. As such, method 600 may be suitable to be performed in a manufacturing environment to test a high number of video decoder devices. Therefore, at least at approximately the same rate as decoded video frames are output by the video decoder device, the decoded video frames can be analyzed according to method 600 to determine if the video decoder device is functional. By analyzing the one or more decoded frames on a block-by-block basis (rather than, for instance, on a pixel-by-pixel basis), the amount of processing power required by the test system may be reduced, thus facilitating method 600 being performed in real time.

Figure 7:
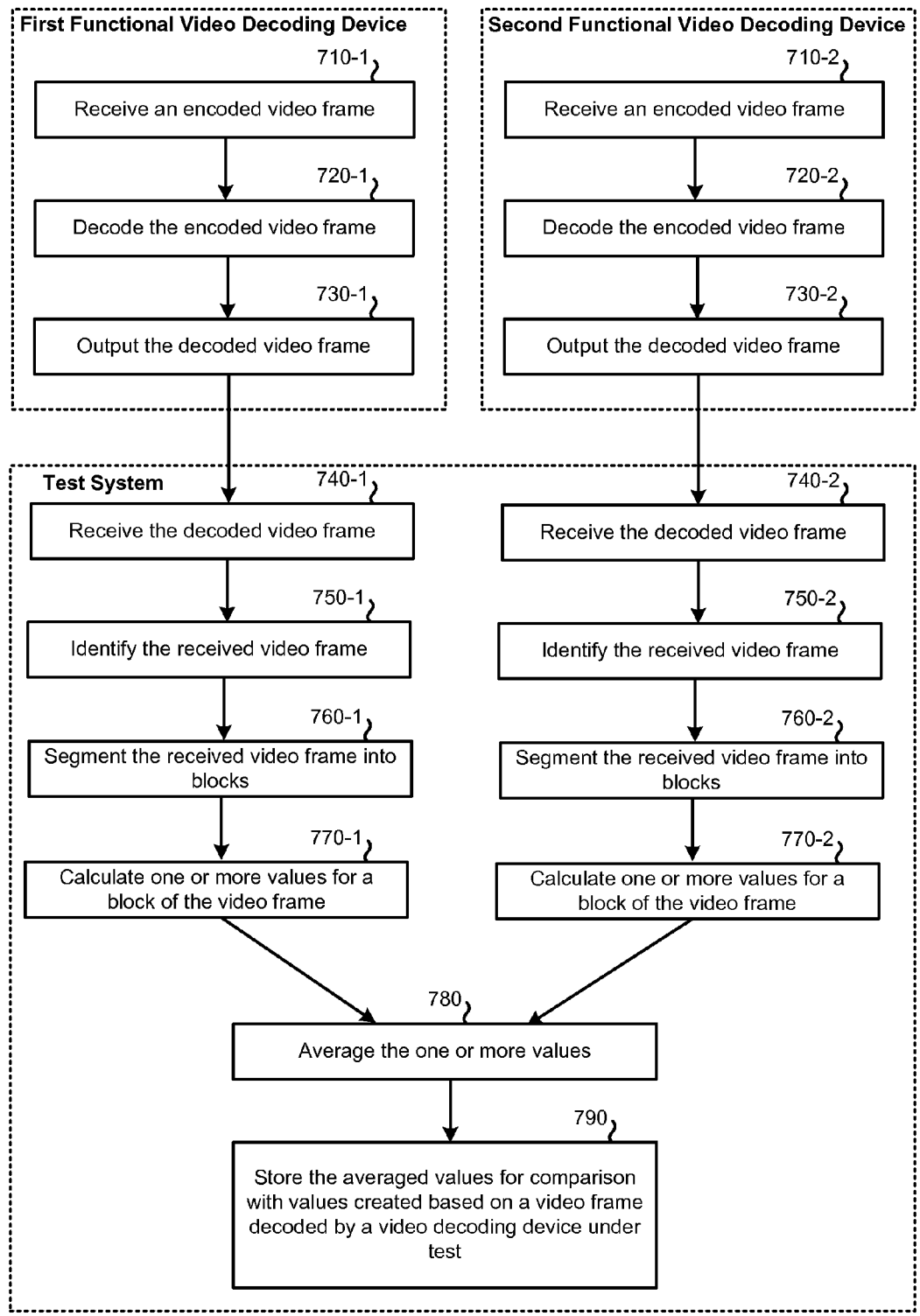
FIG. 7 illustrates an embodiment of a method for creating reference data for use to test the functionality of a video decoder device.

In order to perform method 600, one or more reference values created from reference frames may be required by the test system. FIG. 7 illustrates an embodiment of a method 700 for creating reference data for use to test the functionality of a video decoder device, such as in accordance with method 600. Method 700 may be performed using system 400 of FIG. 4. To perform method 700, one or more known functional video decoder devices, such as set top boxes, may be connected with a source of an encoded series of frames and a test system. Means for performing method 700 include a source of an encoded series of frames, one or more known functional video decoder devices, and a test system. The test system may be combined with the source of the encoded series of frames. The test system and/or the source of the encoded series of frames may be or include one or more computer systems.

At step 710-1, an encoded video frame may be received by a first known functional video decoder device. The one or more video decoder devices used for method 700 may be the same make and/or model of the video decoder devices that will be tested using the reference data created using method 700. This may be because video decoding functionality varies at least slightly between different makes and/or models and may help reduce video decoder devices under test from being incorrectly identified as non-functional.

In FIG. 4, the known functional video decoder devices are set top boxes. The received encoded video frame may be received as part of a series of encoded video frames. The received encoded video frame may be received from a source of encoded video frames, which may be connected with the known functional video decoder devices. The series of encoded video frames used and/or the source of the encoded series of video frames may be the same as the source and series of encoded video frames that will be coupled with a video decoder device under test. As such, the encoded video frames decoded by video decoder devices under test is the same series of encoded video frames as decoded by the known functional devices to create the reference data.

The encoded video frame may include a color pattern or other indication that is used to identify a frame number of the encoded video frame. This color pattern or other visual indication may be preserved following the decode process to create the reference data. The received encoded video frame may be in MPEG format, which may represent the format that the video decoder device under test will decode from during normal operation. At step 720-1, the first known functional video decoder device may decode the encoded video frame to a second format, which may represent the format that video decoder devices under test decode to. At step 730-1, the first known functional video decoder device may output the decoded video frame to the test system, which may be coupled with an output of the first known functional video decoder device.

The steps above performed by the first known functional video decoder device may also be performed by one or more additional known functional video decoder devices (such as the second functional video decoder device in steps 710-2 through 730-2). These steps may be performed in parallel (e.g., at the same time as the first video decoder device) or in series (e.g., each known functional video decoder device is connected to the test system one at a time). For instance, decoded frames may be created by ten known functional video decoder devices and output to the test system for use in creating reference data.

At step 740-1, the decoded video frame from the first functional video decoder device may be received at step 740-1. The two devices may be physically connected, such as via a coaxial cable. At step 750-1, the received decoded video frame may be identified. A frame number of the decoded video frame may be identified. The frame number may be indicated using characters, a color pattern, or some other visual indication of the frame number. The frame number indicated in the decoded video frame may be used to determine: 1) which frames decoded by other known functioning video decoder devices correspond to the decoded frame; and/or 2) which frames decoded by video decoder devices under test should be used for the comparison with the reference data created from the frame decoded by the known functional video decoder device. This received decoded video frame may be stored and used as a reference video frame. In some embodiments, the received decoded video frame may be averaged with one or more other decoded video frames received from other known functional video decoder devices on a pixel-by-pixel basis to create a reference frame.

At step 760-1, the decoded video frame may be segmented into one or more blocks. These blocks may correspond to the same locations within the frame as where blocks will be segmented on a decoded video frame received from a video decoder device under test. At step 770-1, one or more values for a block of the segmented decoded video frame of step 760-1 may be calculated. Step 770-1 may be repeated for some or all blocks of the decoded video frame segmented at step 760-1. For one or more blocks of the segmented decoded video frame, a value may be computed for a specific color. A value may be a summation of the color-specific portion of the RGB triplet for each pixel within the block. As such, a red summation value may be the summation of the red value present in the RGB triplet for each pixel. If three values are calculated for the block, a red summation value, a green summation value, and a blue summation value may be calculated. It should be understood that rather than summations, means, modes, or medians may be calculated for each color.

Other calculations based on the color value of each pixel within a block are also possible.

Steps 740-1 through 770-1 may be repeated for additional video frames. Further, steps 740-1 through 770-1 may be performed for one or more video frames (including the same video frames decoded by the first known functional video decoder) decoded by other known functional video decoder devices. For instance, steps 740-2 through 770-2 may be performed for the second known functional video decoder device. These steps may also be performed for additional known functional video decoder devices.

The color values calculated for a particular block of a particular frame may be averaged (or otherwise combined) across multiple known functional video decoder devices. At step 780, values for a particular block calculated at step 770-1 for the first known functional video decoder device may be averaged with values for the block at the same location of the same numbered frame calculated at step 770-2 for the second known functional video decoder device. The average may include values for the block at the same location of the same numbered frame for multiple other known functional video decoder devices. Despite the video frame being decoded by known functioning video decoder devices, small variances between the decoded video frames may exist (such as illustrated in FIG. 5 at blocks 550), thus averaging color values by block may produce a more accurate reference data set than using decoded frames produced by a single known functioning video decoder device.

At step 780, an average color value for each color of a block, such as an average red summation value, an average green summation value, and an average blue summation value may be calculated. As such, each average summation value may be the average of the summations for the color calculated at step 770 across each known functional video decoder device. At step 780, some or all blocks of the segmented decoded frame may have calculated an associated: average red value summation, average green value summation, and an average blue value summation. Such averages may also be calculated for one or more additional frames. These average values may be stored as the reference values at step 790 for use as reference data, such as for use in method 600.

Figure 8:
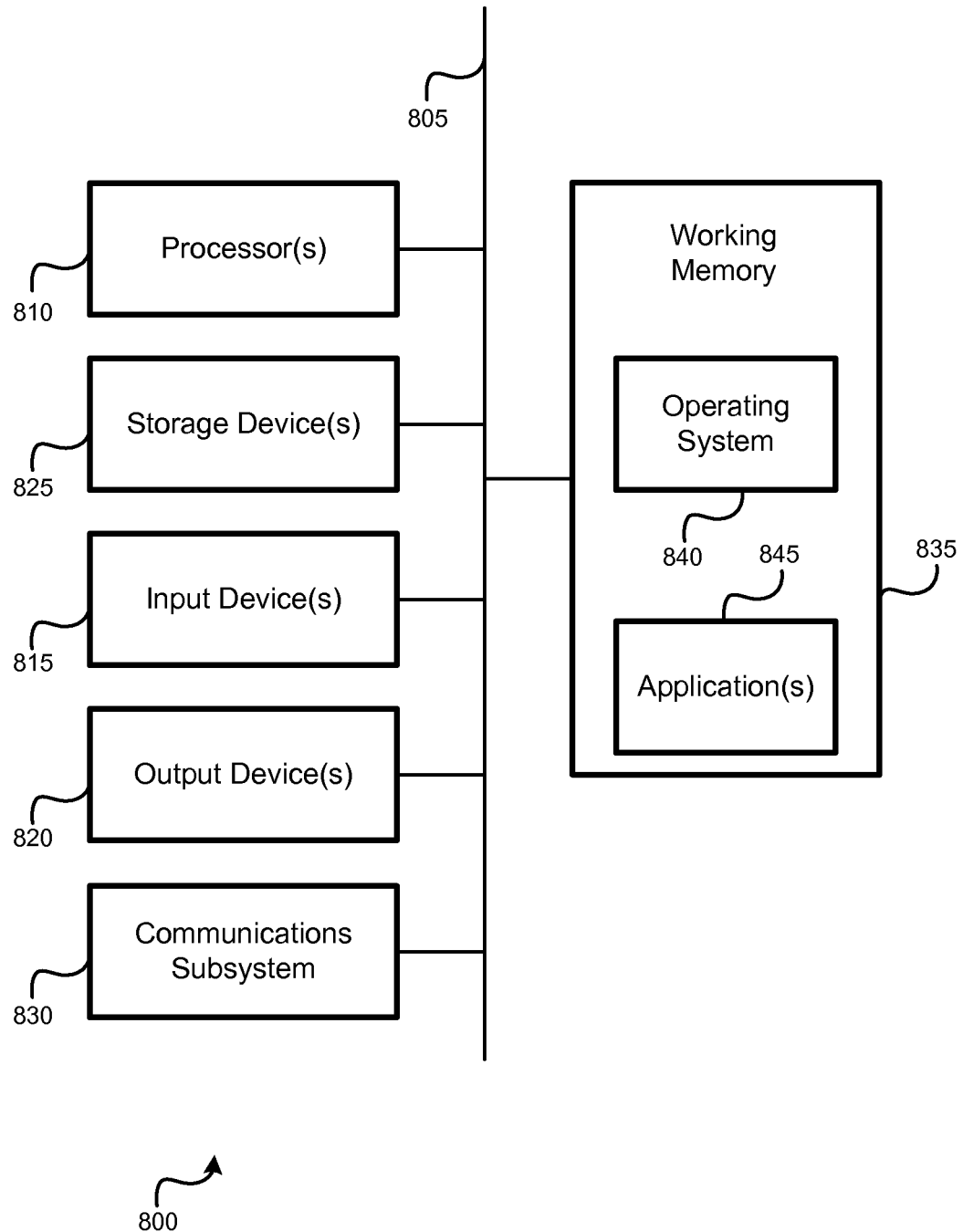
FIG. 8 illustrates an embodiment of a computer system.

FIG. 8 illustrates an embodiment of a computer system. A computer system as illustrated in FIG. 8 may incorporate as part of the previously described devices, such as the sources of encoder series of frames, video decoder devices (e.g., set top boxes), and/or test systems. For example, computer system 800 can represent some of the test systems discussed in this application. FIG. 8 provides a schematic illustration of one embodiment of a computer system 800 that can perform various steps of the methods. It should be noted that FIG. 8 is meant only to provide a generalized illustration of various components, any or all of which may be utilized as appropriate. FIG. 8, therefore, broadly illustrates how individual system elements may be implemented in a relatively separated or relatively more integrated manner.

The computer system 800 is shown comprising hardware elements that can be electrically coupled via a bus 805 (or may otherwise be in communication, as appropriate). The hardware elements may include one or more processors 810, including without limitation one or more general-purpose processors and/or one or more special-purpose processors (such as digital signal processing chips, graphics acceleration processors, and/or the like); one or more input devices 815, which can include without limitation a mouse, a keyboard, and/or the like; and one or more output devices 820, which can include without limitation a display device, a printer, and/or the like.

The computer system 800 may further include (and/or be in communication with) one or more non-transitory storage devices 825, which can comprise, without limitation, local and/or network accessible storage, and/or can include, without limitation, a disk drive, a drive array, an optical storage device, a solid-state storage device, such as a random access memory ("RAM"), and/or a read-only memory ("ROM"), which can be programmable, flash-updateable and/or the like. Such storage devices may be configured to implement any appropriate data stores, including without limitation, various file systems, database structures, and/or the like.

The computer system 800 might also include a communications subsystem 830, which can include without limitation a modem, a network card (wireless or wired), an infrared communication device, a wireless communication device, and/or a chipset (such as a Bluetooth™ device, an 802.11 device, a Wi-Fi device, a WiMax device, cellular communication facilities, etc.), and/or the like. The communications subsystem 830 may permit data to be exchanged with a network (such as the network described below, to name one example), other computer systems, and/or any other devices described herein. In many embodiments, the computer system 800 will further comprise a working memory 835, which can include a RAM or ROM device, as described above.

The computer system 800 also can comprise software elements, shown as being currently located within the working memory 835, including an operating system 840, device drivers, executable libraries, and/or other code, such as one or more application programs 845, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a non-transitory computer-readable storage medium, such as the non-transitory storage device(s) 825 described above. In some cases, the storage medium might be incorporated within a computer system, such as computer system 800. In other embodiments, the storage medium might be separate from a computer system (e.g., a removable medium, such as a compact disc), and/or provided in an installation package, such that the storage medium can be used to program, configure, and/or adapt a general purpose computer with the instructions/code stored thereon. These instructions might take the form of executable code, which is executable by the computer system 800 and/or might take the form of source and/or installable code, which, upon compilation and/or installation on the computer system 800 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer system (such as the computer system 800) to perform methods in accordance with various embodiments of the invention. According to a set of embodiments, some or all of the procedures of such methods are performed by the computer system 800 in response to processor 810 executing one or more sequences of one or more instructions (which might be incorporated into the operating system 840 and/or other code, such as an application program 845) contained in the working memory 835. Such instructions may be read into the working memory 835 from another computer-readable medium, such as one or more of the non-transitory storage device(s) 825. Merely by way of example, execution of the sequences of instructions contained in the working memory 835 might cause the processor(s) 810 to perform one or more procedures of the methods described herein.

The terms "machine-readable medium" and "computer-readable medium," as used herein, refer to any medium that participates in providing data that causes a machine to operate in a specific fashion. In an embodiment implemented using the computer system 800, various computer-readable media might be involved in providing instructions/code to processor(s) 810 for execution and/or might be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the non-transitory storage device(s) 825. Volatile media include, without limitation, dynamic memory, such as the working memory 835.

Common forms of physical and/or tangible computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to the processor(s) 810 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 800.

The communications subsystem 830 (and/or components thereof) generally will receive signals, and the bus 805 then might carry the signals (and/or the data, instructions, etc. carried by the signals) to the working memory 835, from which the processor(s) 810 retrieves and executes the instructions. The instructions received by the working memory 835 may optionally be stored on a non-transitory storage device 825 either before or after execution by the processor(s) 810.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered. Accordingly, the above description does not bound the scope of the claims.

What is claimed is:

1. A method of testing a video decoding device, the method comprising:
    acquiring, by a video test computer system from the video decoding device under test, a decoded video frame;
    calculating, by the video test computer system, a first pixel block value for a first block of pixels from the decoded video frame;
    calculating, by the video test computer system, a second pixel block value for a second block of pixels from the decoded video frame; and
    determining, by the video test computer system, whether the video decoding device is accurately decoding video at least partially based on a pixel block reference value, the first pixel block value, and the second pixel block value.

2. The method of testing the video decoding device of claim 1, wherein the first block of pixels and the second block of pixels are the same block.

3. The method of testing the video decoding device of claim 2, wherein the first pixel block value corresponds to a first particular color selected from the group consisting of red, green, and blue and the second pixel block value corresponds to a second particular color selected from the group consisting of red, green, and blue that differs from the first particular color.

4. The method of testing the video decoding device of claim 1, wherein determining, by the video test computer system, whether the video decoding device is properly decoding video comprises comparing, by the video test computer system, the first pixel block value with the pixel block reference value.

5. The method of testing the video decoding device of claim 4, wherein determining, by the video test computer system, whether the video decoding device is properly decoding video comprises comparing, by the video test computer system, the second pixel block value with a second pixel block reference value.

6. The method of testing the video decoding device of claim 1, further comprising:
receiving, by the video test computer system, a user-defined threshold range, wherein determining, by the video test computer system, whether the video decoding device is accurately decoding video is further based on the user-defined threshold range.

7. The method of testing the video decoding device of claim 6, wherein determining, by the video test computer system, whether the video decoding device is properly decoding video comprises: determining, by the video test computer system, whether the video decoding device is accurately decoding video at least partially based on the first pixel block value being within the user-defined threshold range of the pixel block reference value.

8. A test system for testing a video decoding device, the test system comprising:
one or more processors; and
a memory communicatively coupled with and readable by the one or more processors and having stored therein processor-readable instructions which, when executed by the one or more processors, cause the one or more processors to:
receive, from the video decoding device under test, a decoded video frame;
calculate a first pixel block value for a first block of pixels from the decoded video frame;
calculate a second pixel block value for a second block of pixels from the decoded video frame; and
determine that the video decoding device is accurately decoding video using a pixel block reference value, the first pixel block value, and the second pixel block value.

9. The test system for testing the video decoding device of claim 8, wherein the first block of pixels and the second block of pixels are the same block of pixels.

10. The test system for testing the video decoding device of claim 9, wherein the first pixel block value corresponds to a first particular color selected from the group consisting of red, green, and blue and the second pixel block value corresponds to a second particular color selected from the group consisting of red, green, and blue that differs from the first particular color.

11. The test system for testing the video decoding device of claim 8, wherein the processor-readable instructions that, when executed, cause the one or more processors to determine that the video decoding device is properly decoding video comprise processor-readable instructions which, when executed, cause the one or more processors to compare the first pixel block value with the pixel block reference value.

12. The test system for testing the video decoding device of claim 11, wherein the processor-readable instructions that, when executed, cause the one or more processors to determine that the video decoding device is properly decoding video comprise processor-readable instructions which, when executed, cause the one or more processors to compare the second pixel block value with a second pixel block reference value.

13. The test system for testing the video decoding device of claim 8, wherein the processor-readable instructions, when executed, further cause the one or more processors to:
receive a user-defined threshold range, wherein the processor-readable instructions that, when executed, cause the one or more processors to determine that the video decoding device is accurately decoding video is further based on the user-defined threshold range.

14. The test system for testing the video decoding device of claim 13, wherein the processor-readable instructions that, when executed, cause the one or more processors to determine that the video decoding device is properly decoding video comprise processor-readable instructions which, when executed, cause the one or more processors to determine that the video decoding device is accurately decoding video at least partially based on the first pixel block value being within the user-defined threshold range of the pixel block reference value.

15. A non-transitory processor-readable medium for testing a video decoding device by a video test system comprising processor-readable instructions configured to cause one or more processors to:
receive, from the video decoding device under test, a decoded video frame;
calculate a first pixel block value for a first block of pixels from the decoded video frame;
calculate a second pixel block value for a second block of pixels from the decoded video frame; and
determine that the video decoding device is accurately decoding video using a pixel block reference value, the first pixel block value, and the second pixel block value.

16. The non-transitory processor-readable medium for testing the video decoding device by the video test system of claim 15, wherein the first block of pixels and the second block of pixels are the same block of pixels.

17. The non-transitory processor-readable medium for testing the video decoding device by the video test system of claim 15, wherein the processor-readable instructions are further configured to cause the one or more processors to:
receive a user-defined threshold range, wherein the processor-readable instructions that, when executed, cause the one or more processors to determine that the video decoding device is accurately decoding video further uses the user-defined threshold range.

18. The non-transitory processor-readable medium for testing the video decoding device by the video test system of claim 17, wherein the processor-readable instructions configured to cause the one or more processors to determine that the video decoding device is properly decoding video comprise processor-readable instructions configured to cause the one or more processors to determine that the video decoding device is accurately decoding video at least partially based on the first pixel block value being within the user-defined threshold range of the pixel block reference value.

19. The non-transitory processor-readable medium for testing the video decoding device by the video test system of claim 15 wherein the processor-readable instructions configured to cause the one or more processors to determine that the video decoding device is properly decoding video comprise processor-readable instructions configured to cause the one or more processors to compare the first pixel block value with the pixel block reference value.

20. The non-transitory processor-readable medium for testing the video decoding device by the video test system of claim 19, wherein the processor-readable instructions that, when executed, cause the one or more processors to determine that the video decoding device is properly decoding video comprise processor-readable instructions configured to cause the one or more processors to compare the second pixel block value with a second pixel block reference value.

* * * * *